United States Patent [19]

Haltof

[11] 4,208,575
[45] Jun. 17, 1980

[54] CREDIT CARD OR CHECK VALIDATOR

[75] Inventor: Garry P. Haltof, Rochester, N.Y.

[73] Assignee: Valmet Corporation, Rochester, N.Y.

[21] Appl. No.: 5,226

[22] Filed: Jan. 22, 1979

Related U.S. Application Data

[63] Continuation-in-part of Ser. No. 854,121, Nov. 23, 1977, abandoned.

[51] Int. Cl.² .................. G06K 5/00; H04Q 3/00
[52] U.S. Cl. .................. 235/380; 340/149 A
[58] Field of Search .............. 235/380, 382, 379, 381; 340/149 A, 149 R, 152 R

[56] References Cited

U.S. PATENT DOCUMENTS

| | | | |
|---|---|---|---|
| 3,387,265 | 6/1968 | Smeiman | 235/392 |
| 3,439,339 | 4/1969 | Parks | 340/149 A |
| 3,643,064 | 2/1972 | Hudson, Jr. | 235/380 |
| 3,648,021 | 3/1972 | Rogers | 235/380 |
| 3,654,522 | 4/1972 | Isserstedt | 340/149 A |
| 3,656,110 | 4/1972 | Crane | 340/149 A |
| 3,665,162 | 5/1972 | Yamamoto et al. | 235/380 |
| 3,846,622 | 11/1974 | Meyer | 235/382 |
| 3,906,201 | 9/1975 | Housman et al. | 235/380 |
| 4,016,404 | 4/1977 | Appleton | 235/380 |
| 4,023,012 | 5/1977 | Ano et al. | 235/380 |

*Primary Examiner*—Daryl W. Cook
*Attorney, Agent, or Firm*—Stonebraker, Shepard & Stephens

[57] ABSTRACT

A validator checks the identity of the holder of a credit card or check by comparing a secret code number derived from the holder with a number derived from the serial number of the credit card or check. The basic components of the validator are a keyboard, a scrambler circuit and a comparator circuit. The scrambler circuit is responsive to the keyboard for receiving a serial number or other indicia from the card as punched into the keyboard. Then a key is pressed to signify end of the card indicia and to switch the keyboard output to the comparator circuit. A number offered by the user is punched into the keyboard; and if the number is correct, the comparator circuit is actuated to indicate validity. Such a machine can use any existing credit card, check, or identification card having a serial number; can operate on serial number and letter combinations of any length; and can operate in a way that is undecipherable for practical purposes.

39 Claims, 8 Drawing Figures

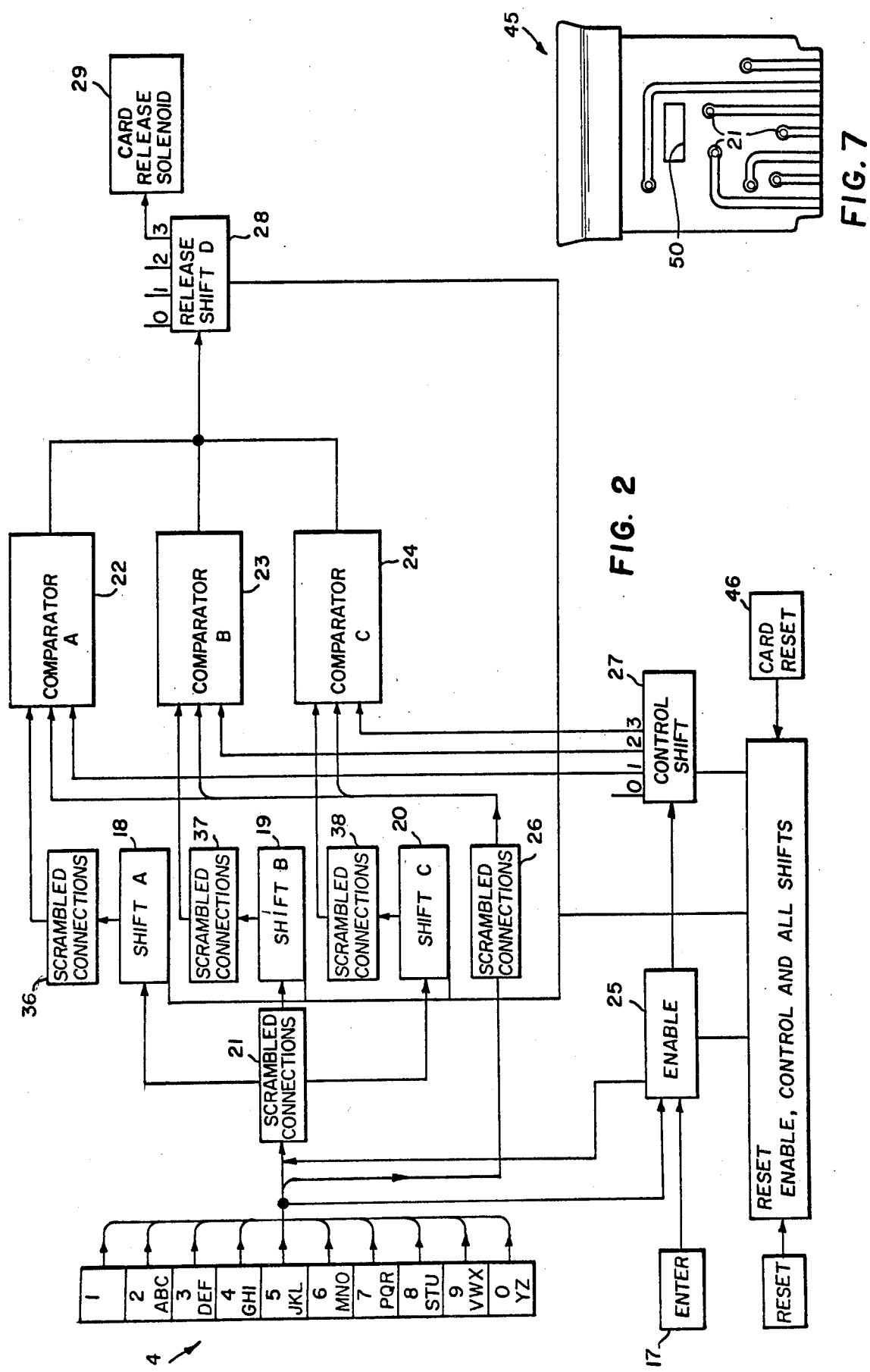

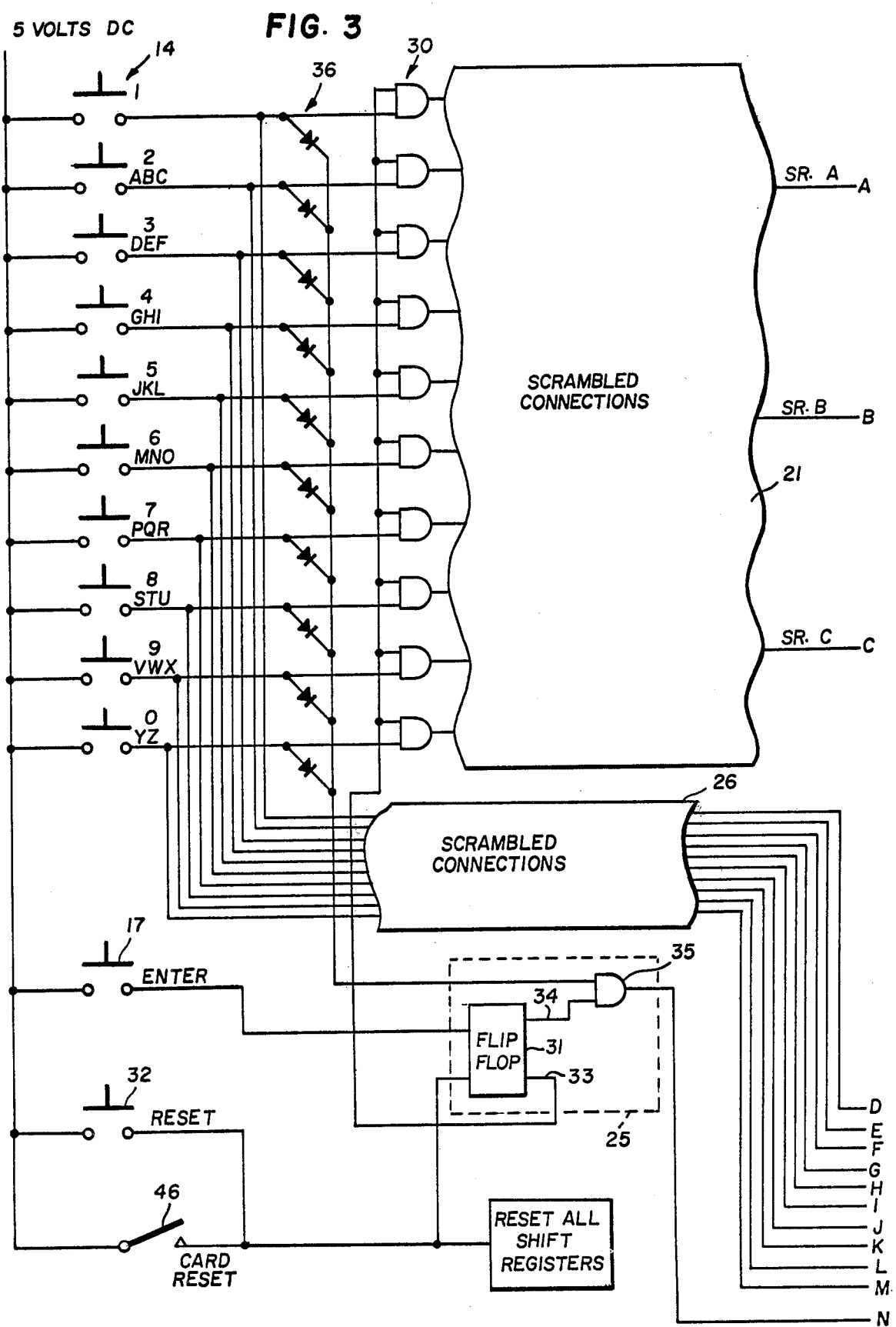

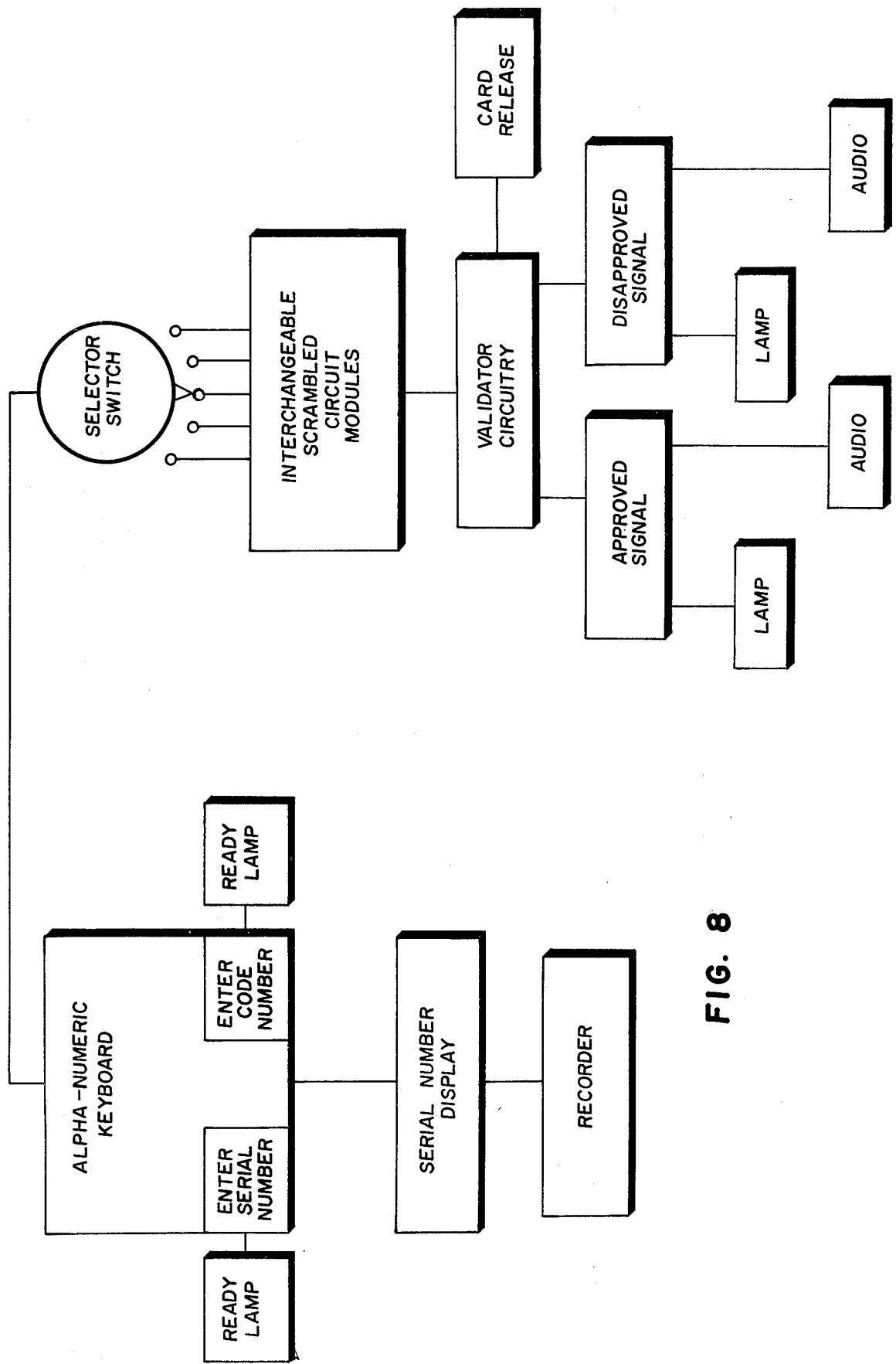

CREDIT CARD OR CHECK VALIDATOR

RELATED APPLICATIONS

This application is a Continuation-In-Part of my parent application Ser. No. 854,121, filed Nov. 23, 1977, entitled CREDIT CARD VALIDATOR, and abandoned upon the filing of this Continuation-in-part application.

THE INVENTIVE IMPROVEMENT

Many credit card validators have been suggested, and the desirability of a simple device for validating credit cards is well known. The invention recognizes the drawbacks in many of the previous suggestions and proposes a simpler and more effective credit card validator that can also be used for checks and identification cards. For example, many previous card validators required equipment for reading card serial numbers or an invisible code contained in the card and known to the authorized user, and this required special cards and fairly complicated card-reading equipment. Other suggestions have required connection to computing equipment or have otherwise been complex and expensive.

The invention involves recognition of a simple and self-sufficient device that can be placed near a cash register to validate existing credit cards or checks that may have serial numbers of different lengths and different combinations of letters and numbers located at different places on the card. The invention can also capture invalid credit cards by holding a credit card and not releasing it until the validating code number is offered. Generally, the invention aims at simplicity, reliability, economy and effectiveness in a credit card validator.

SUMMARY OF THE INVENTION

The inventive credit card or check validator has an input keyboard, a scrambler circuit responsive to the keyboard for receiving indicia from the card or check as punched into the keyboard, and a comparator circuit responsive to the keyboard for receiving code data from the user of the card or check as punched into the keyboard. The device includes manually operable means for shifting the output of the keyboard from the scrambler circuit to the comparator circuit at the end of the input of the card indicia, and means responsive to actuation of the comparator circuit by the correct input of code data for indicating validity of the card or check.

DRAWINGS

FIG. 2 is a schematic diagram of a preferred operation of the credit card validator of FIG. 1;

FIG. 7 is an elevational view of a printed circuit, plug-in module for use in the validator of FIG. 1; and FIG. 8 is a schematic diagram of alternative components combinable with a basic validator according to the invention.

DETAILED DESCRIPTION

Figure 1:
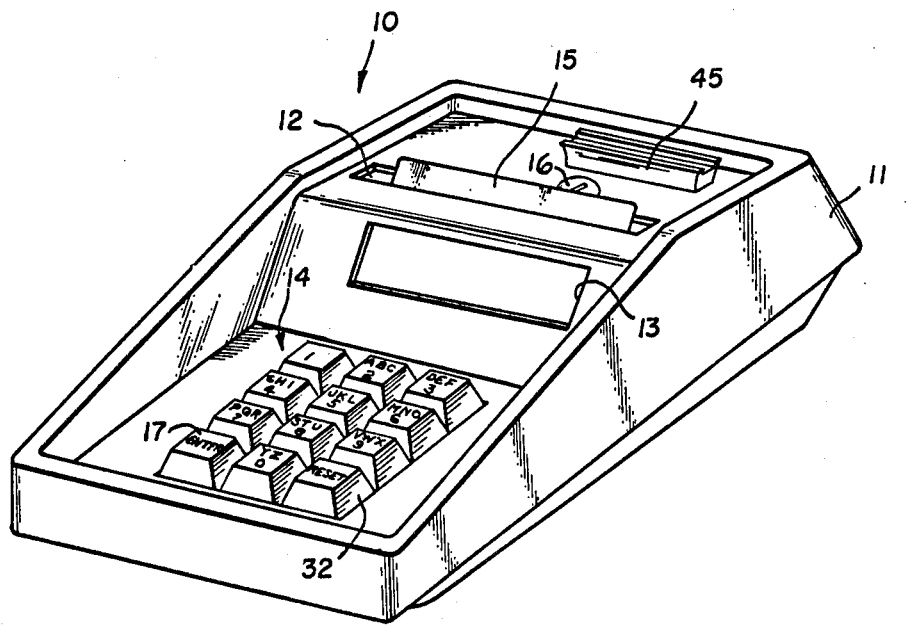
FIG. 1 is a perspective view of a preferred embodiment of the inventive credit card validator.

The inventive validator can be used for credit cards, checks, or identification cards having serial numbers of any length or any combination of letters or numbers located in any position. The same validator can even be used for a variety of different lengths or types of serial numbers for different cards or checks, because its operation is not dependent on any particular serial number format. Part of the reason for its versatility in this regard is that it does not use an algorithm to arithmetically process a serial number. For simplicity, the inventive validator is described hereafter relative to a credit card, even though its use extends to checks and other identification cards.

One preferred embodiment of the inventive validator as shown in the drawings receives and holds a credit card during the validation process and releases the card only when the holder provides a confirmed code number. This results in capturing credit cards presented without the proper validating code number to help remove such cards from circulation. Other preferred embodiments of the inventive validator operate without holding the card within the machine and merely indicate whether the secret code number offered by the user confirms the card as valid or invalid. This is described more fully below along with other components that can be combined with the basic validator concepts of the invention. The following description first explains the construction and use of the illustrated validator that holds a credit card during the validating process and releases it only if the correct code number is offered by the card user.

The inventive credit card validator 10 of FIG. 1 preferably has a housing 11, a slot 12 for receiving a credit card 15, a window 13 for viewing the serial number on card 15 when it is in slot 12, an input keyboard 14, a plug-in module 45, and a lock 16. Generally, card 15 is inserted in slot 12 and locked in validator 10 until validated. The serial number or other indicia from card 15 is punched in by using the keys of keyboard 14, and then an "enter" key 17 is pressed to signify the end of the card indicia. Following this, a validating code number offered by the card user from memory or from a separate storage place is punched into keyboard 14; and if the validating code number is correct, a device that locks card 15 in machine 10 releases card 15 and lets it pop up like a piece of toast. Without the validating code number, card 15 cannot be released except by a key in lock 16, and the key is preferably held by the store manager. This lets validator 10 capture invalid cards and remove them from circulation. Module 45 is preferably interchangeable to vary the scramble pattern and is held in place by lock 16. The validator can also be provided with indicator lights; for example, a green light indicating a validated card and a red light indicating a non-validated card. Moreover, the validator can be used to validate checks as well as credit cards.

FIG. 2 shows the preferred operation of validator 10. The keys of keyboard 14 are preferably marked with 10 digits from 1 to 0 and the letters of the alphabet, so that any combination of numbers and letters of any length on a credit card can be used by validator 10. A scrambler circuit formed of 3 shift registers 18-20 identified as shift A, shift B, and shift C receives inputs from keyboard 14 through scrambled connections 21 that have a predetermined, scrambled pattern. Shift registers 18-20 are commercially available and respond to an input by advancing an output step, and the scrambled connections 21 direct outputs from each digit key of keyboard 14 to one of the shift registers 18–20 in a scrambled pattern. The outputs from each of the shift registers 18–20 are fed, preferably through scrambled connections 36–38, to three comparators 22–24 identified as comparator A, comparator B and comparator C. Scrambled connections 36–38 connect each shift register output to its respective comparator in a predetermined pattern.

"Enter" key 17 switches an enable circuit 25 normally connecting keyboard 14 to shift registers 18–20. Operation of "enter" key 17 severs this connection, connects keyboard 14 to comparators 22–24, preferably through scrambled connections 26, and activates control shift 27 to direct a first digit of a validating code to comparator A, a second digit to comparator B, and a third digit to comparator C.

Outputs from comparator circuits 22–24 are fed to a release shift register 28. The outputs of register 28 are shifted one step for each output from comparators 22–24, so that if each digit of the validating code is correct, release shift 28 advances to its third output which is effective to operate card release solenoid 29. This releases card 15 from validator 10; and if the validating code is incorrect, card 15 remains trapped and must be removed by a key in lock 16.

Figure 3:
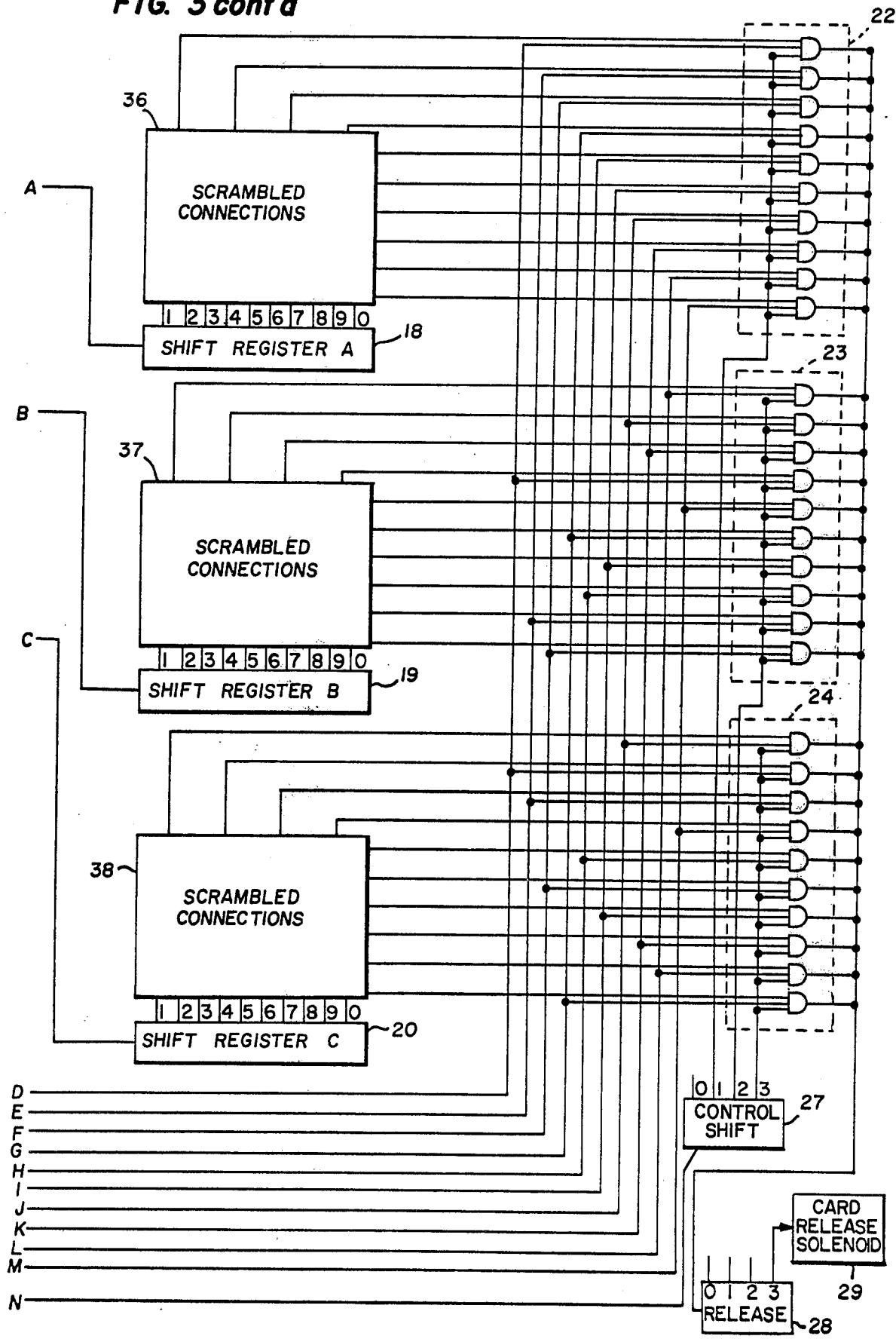
FIG. 3 is a schematic and more detailed diagram of a preferred operation of the functions of FIG. 2.

FIG. 3 shows preferred details of operations for the functions of FIG. 2. The labeled switches 1–0 of keyboard 14 are connected to an array of 10 AND gates 30, and enable circuit 25 has a flip-flop 31 having an output line 33 also connected to AND gates 30. A reset button and switch 32 connects to flip-flop 31; and when the validator is reset, a flip-flop 31 has an output in line 33 to AND gate array 30. This enables an output from any of the 1–0 switches of keyboard 14 to be input through the AND gate array 30 to the scrambler circuit via scrambled connections 21. An output from any of the 1–0 keys that is input to any shift register 18–20 causes the shift register to advance one step of its 10 outputs. Shift registers 18–20 are preferably wired so that more than 10 inputs recycles the register for continuously counting. Then, any bit length of card indicia can be punched into keyboard 14 and assimilated by shift registers 18–20 since any number or letter advances one of the shift registers one step.

After the card indicia is punched into shift registers 18–20, the "enter" button 17 is pressed to change the state of flip-flop 31 in enable circuit 25. The output signal from flip-flop 31 then shifts from output 33 to output 34 which is fed to AND gate 35. AND gate 35 is also connected through an array of diodes 36 to the digit keys 1–0 of keyboard 14; and when flip-flop 31 is in the "enter" position with an output in line 34, input through keyboard 14 is fed through AND gate 35 to control shift 27. Also, lack of an output in line 33 disables AND gate array 30 so that no more input can be fed to the shift registers 18–20 of the scrambler circuit.

Comparators 22–24 are each composed of an array of ten, three-input AND gates as illustrated and such comparators are commercially available. The upper input to each of the gates in comparators 22–24 is connected respectively to an output of shift registers 18–20, preferably through scrambled connections 36–"arranged in a predetermined pattern. The next input to each of the AND gates of comparators 22–24 is the 1–0 key inputs from keyboard 14 connected through scrambled connections 26. The bottom inputs to the AND gates of comparators 22–24 are connected respectively to the first, second, and third outputs of control shift 27.

After "enter" key 17 is actuated to shift keyboard 14 to comparators 23–24 as described above, the first key pressed shifts control shift 27 to its first output which is fed to all ten AND gates of comparator 22. One of these AND gates also has an input from shift register 18 through scrambled connections 36. If the same AND gate also receives an input from keyboard 14 through scrambled connections 26, an output occurs from comparator 22; and this is fed to release shift register 28 to advance its output to the number 1 position. If the keyboard number is incorrect, no AND gate of comparator 22 will have three inputs and there will be no output to shift registers 28.

When the second code number key is pressed, control shift 27 moves to its second output to the AND gates of comparator 23, one of which also receives an output from shift register 19 through scrambled connections 37. If the correct key is pressed, this same AND gate receives a third output and advances release shift 28 to its second position. The third code digit advances control shift 27 to its third position for an input to the AND gates of comparator C; and if the key pressed puts an input into the AND gate already receiving an input from shift register 20, then release shift 28 advances to its third output position which is connected to card release solenoid 29 to release card 15 from validator 10. Hence, if any code number is incorrect, release shift 28 will not advance to its third position; and card release solenoid 29 will not be operated. This leaves card 15 trapped in validator 10.

If an error is made in punching card or code indicia into keyboard 14, or if for some other reason validator 10 should be reset, reset button 32 is operated to produce an input to enable circuit 25 and to reset all shift registers. This sets all shift registers back to 0 and produces an output in line 33 of flip-flop 31 to connect digit keys 1–0 of keyboard 14 to the scrambler circuit through AND gate array 30. The validating process can then be repeated to see if the card user can produce the correct validating code.

When card 15 is released after a successful validation, card reset switch 46 operates in parallel with reset button 32 to achieve the same reset effect through an input to enable circuit 25 and all shift registers. Card reset 46 is preferably a switch responsive to removal of card 15 so that an automatic reset is not accomplished until card 15 is withdrawn beyond the control of the card retaining mechanism.

Figure 4:
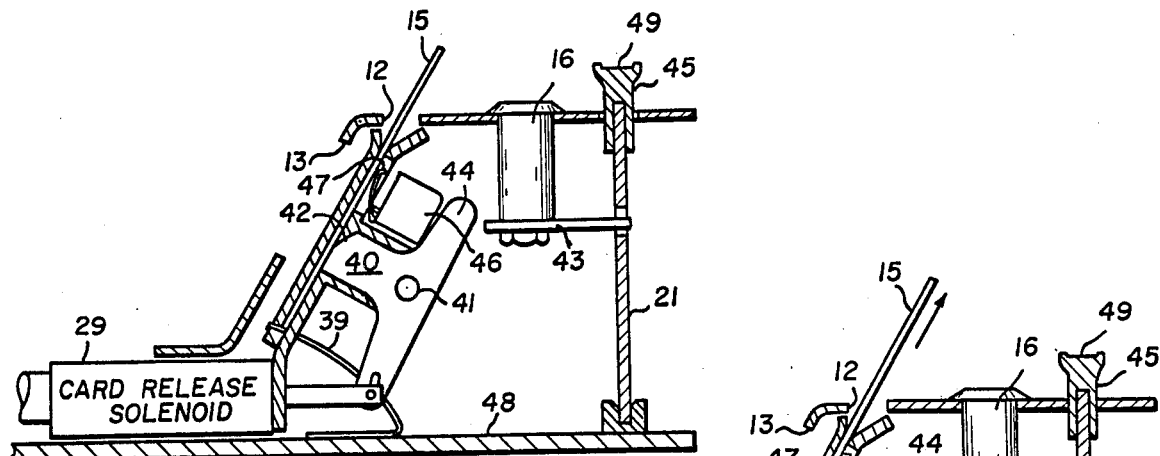
FIGS. 4 and 5 are fragmentary, partially schematic, cut-away views of a card-holding and releasing mechanism for the validator of FIG. 1.
Figures 5, 6:
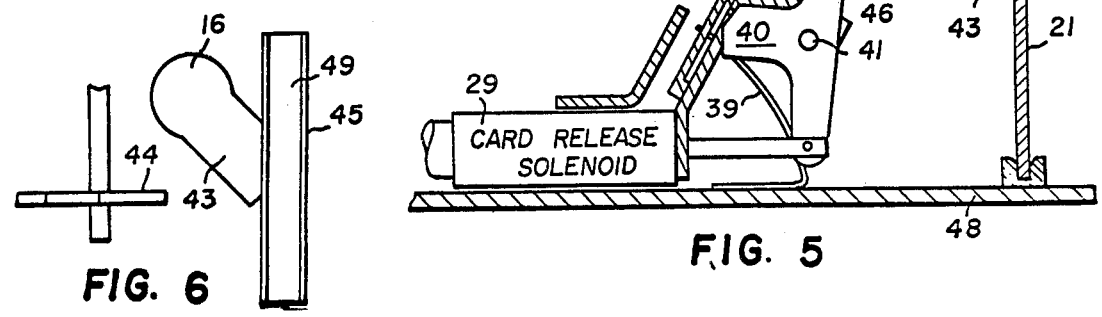
FIG. 6 is a fragmentary plan view of the lock release mechanism of FIGS. 4 and 5.

FIGS. 4–6 show a preferred card release mechanism for use in validator 10. Card 15 is pushed downward to the bottom of slot 12, and the bottom of card 15 engages spring 39 and presses it downward as shown in FIG. 4. A pawl 40 mounted on pivot 41 has a cammed nose 42 that lets card 15 slide downward, but grips card 15 tightly and prevents its upward withdrawal. Any upward pull on card 15 merely tightens the grip of pawl nose 42 so that card 15 is trapped.

The serial number on card 15 is visible through window 13, and the validating process described above is carried out. When the successful validating code is input into the validator, card release solenoid 29 is operated to pivot pawl 40 to the position shown in FIG. 5 where it clears card 15. This lets spring 39 snap upward to pop card 15 up out of the validator like toast. If the card cannot be released by a valid code, a key operated in lock 16 can pivot arm 43 against a lever 44 on pawl 40 to pivot pawl 40 to the position illustrated in FIG. 5 for releasing card 15.

Also shown in FIGS. 4 and 5 is card reset switch 46 positioned adjacent slot 12 and having a card engaging arm 47 so that switch 46 effects a reset when the bottom of card 15 moves above arm 47. This ensures that card 15 is clear of pawl 40 before automatic reset occurs.

FIGS. 4–7 show a plug-in module 45 for scrambled connections 21. Module 45 plugs into a main circuit board 48 and carries a predetermined pattern of scrambled connections 21 between the keyboard and the shift registers. Module 45 can be interchanged with a similar module having a different scrambled connection pattern to change the validating code of machine 10. For this purpose, the upper end of module 45 protrudes above housing 11 as illustrated for removal and interchange without opening up machine 10. A slot 49 can be used for identifying the store name or type or number of scrambling code. To prevent any unauthorized tampering with module 45, it preferably has a hole 50 engaged by the lock arm 43 of lock 16 in the locked position as illustrated in FIGS. 4 and 6 to prevent any withdrawal of module 45 until lock 16 is unlocked.

The inventive card validator can be used with any number of shift registers in a scrambler circuit and any corresponding number of comparator circuits, but three each have been found adequate to provide a practically workable code. The scrambled connections can be accomplished merely by connecting different wires of one component to the inputs or outputs of another component, and this can all be duplicated by color coding so that machines can be built with various scramble patterns. Thus, one set of machines can be scrambled in one way for one type of credit card, and the same basic machine can be scrambled another way for another type of credit card. Also, the scrambling can be changed at any time desired simply by plugging in new modules 45 with a different scramble pattern. This makes the inventive validator universal and applicable to any type of existing credit card. Furthermore, it can respond to any combination or length of letters and numbers in any serial number or card indicia system. The length of the validating code corresponds to the number of comparator circuits, and larger lengths of validating codes are possible for greater security.

Enable circuit 25 can use various commercially available components for flip-flop 31, including AND gate combinations. Keyboard 14 is simple and preferably in the familiar form of a touch tone telephone keyboard with the addition of "enter" key 17 and reset key 32. Such keyboards are commercially available along with other components of the validator so that it is readily and economically assembled from available equipment. Its power consumption is slight; it can be made small, compact, and convenient; and it operates independently of other equipment.

Alternative preferred embodiments using components combinable with the basic validator circuitry as described above are illustrated in FIG. 8. Several different models of validators can be made from the illustrated components to operate at various levels of sophistication. All use the same basic entry keyboard, scrambled connections, shift registers, and comparators, with some validity indicator. Instead of holding the card during the validation process and releasing the card as an indication of its validity, validity of a card can be signaled by lights, audible signals, or other devices such as schematically illustrated in FIG. 8 by an "approved" signal and a "disapproved" signal distinguishing between valid and invalid cards. There are several generally known ways that indicator lamps, audible signals, and other indicator devices can be used to distinguish clearly between valid and invalid cards.

Another feature schematically illustrated in FIG. 8 is an array of a plurality of interchangeable scrambled circuit modules arranged in the validator so that different scrambled circuits can be selected by a selector switch. If a code is compromised so that scrambled circuits must be changed for security reasons, the selector switch can be moved to a different position several times before scrambled circuit modules have to be replaced. Also, a selectable array of scrambled circuits allows the same validator to use different scrambled circuit patterns for different cards or checks, thus providing greater security for each type of card or check validated.

Instead of an enter key and a reset key as explained above, keys having the same respective functions can be labeled for "enter code number" and "enter serial number" to help make the operation of the validator easily understood. The "enter serial number" key works in the same way as a reset key in restoring the validator to an initial condition in readiness for receiving keyboard entry of the serial number of a card to be validated. A ready lamp can be used to indicate this condition to the operator. Another helpful addition is a serial number display so that the serial number as entered via the keyboard can be read from the display to confirm that the serial number is entered without error. The "enter code number" key can then be used in the same way as the "enter" key explained above for entering the code number offered by the card holder, and another ready lamp can be used to show receptiveness of the validator for the code number.

Another device can be added to more sophisticated models of the inventive validator is a recorder such as a magnetic tape recorder for keeping a record of all keyboard entries. This can show what serial numbers and code numbers were entered for confirming that the validator was properly used if transactions are later disclaimed. A recorder can also be instrumental in securing merchants from loss from transactions in which the validator was properly used.

A code generator can be made with the same basic circuitry as the validator, including an entry keyboard, scrambled connections, and shift registers to generate code numbers from serial numbers that are entered via keyboard. For any system using a relatively small number of cards or other documents having serial numbers, a code generator duplicating the scrambled circuitry of the validator can be used to produce the secret code numbers assigned to card holders, and any necessary changes in code numbers can be accomplished by changing the scrambled circuits of the code generator and the validators to produce new code numbers from existing serial numbers. A code generator also preferably has a reset key and displays for showing keyboard entries to confirm that code numbers are generated without error.

A recording device can be added to a code generator for security purposes in providing a record of all keyboard entries. A computer can also be programmed to generate code numbers from serial numbers by proceeding through the same steps that are produced by the scrambled connections. This differs from the usual algorithms used to process numbers in that the scrambled connections produce number substitutions that make no sense except as an expression of the particular scrambled connections, which must be fed into the computer.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate the various ways a validator can be built with various materials and components to meet specific circumstances.

I claim:

1. A credit card or check validator comprising:
   a. a keyboard;
   b. a scrambler circuit responsive to entry via said keyboard of data derived from indicia on said card or check;
   c. a comparator circuit responsive to entry via said keyboard of code data derived from the user of said card or check;
   d. manually operable means for shifting an output of said keyboard from said scrambler circuit to said comparator circuit at the end of said entry of said data derived from said card or check; and
   e. means responsive to actuation of said comparator circuit by input of a correct sequence of said code data for indicating validity of said card or check.

2. The validator of claim 1 wherein said means for shifting said keyboard output comprises switch means and a key on said keyboard for changing the state of said switch means.

3. The validator of claim 2 including reset means for resetting said scrambler circuit and for changing the state of said switch means to direct said output of said keyboard to said scrambler circuit.

4. The validator of claim 3 including manual means for operating said reset means.

5. The validator of claim 3 including automatic means for operating said reset means when said card or check is indicated to be valid.

6. The validator of claim 3 wherein said key for changing the state of said switch means is formed as an "enter code" key, and said reset means is formed as an "enter serial number" key on said keyboard.

7. The validator of claim 1 wherein said indicating means includes two lamps and an audible signal for distinguishing between valid and invalid cards or checks.

8. The validator of claim 1 including means for receiving a credit card; means for holding said credit card in said receiving means; and said validity indicating means comprising means for releasing said card from said receiving means.

9. The validator of claim 8 wherein said card-holding means comprises a pawl arranged to allow insertion of said card into said receiving means and to resist withdrawal of said card from said receiving means.

10. The validator of claim 9 including spring means biased by insertion of said card into said receiving means for popping said card up on release of said pawl.

11. The validator of claim 9 including electromagnetic means for actuating said pawl to release said card.

12. The validator of claim 9 including key and lock means for actuating said pawl to release said card.

13. The validator of claim 12 wherein said scrambler circuit includes a plug-in module that is interchangeable to vary the scramble pattern, and wherein said key and lock means retains said module in place.

14. The validator of claim 8 including means for making said card indicia visible when said card is in said receiving means.

15. The validator of claim 1 wherein the keys of said keyboard are arranged to signify numbers and letters of the alphabet.

16. The validator of claim 1 wherein said scrambler circuit has the capacity to receive different lengths of said card or check indicia.

17. The validator of claim 1 wherein said keyboard has 10 keys for alphabet letters and digits from 0 to 9, a key for said output shifting means, and a reset key.

18. The validator of claim 1 including means for displaying said data derived from indicia on said card or check as entered via said keyboard.

19. The validator of claim 18 including means for recording entries made on said keyboard.

20. The validator of claim 1 wherein said scrambler circuit includes a plug-in module that is interchangeable to vary the scramble pattern.

21. The validator of claim 1 including a plurality of said scrambler circuits and a selector switch for connecting one of said plurality of said scrambler circuits with said keyboard.

22. The validator of claim 21 wherein said scrambler circuits are formed as interchangeable plug-in modules.

23. The validator of claim 20 including key and lock means for retaining said module in place.

24. The validator of claim 1 wherein said scrambler circuit comprises a plurality of shift registers coupled to said keyboard in a predetermined, scrambled pattern so each actuation of a key on said keyboard to enter said data derived from said card or check indicia advances one of said shift registers.

25. The validator of claim 24 wherein said shift registers can receive different lengths of said card or check indicia.

26. The validator of claim 25 wherein the keys of said keyboard are arranged to signify numbers and letters of the alphabet.

27. The validator of claim 1 wherein said comparator circuit comprises a plurality of arrays of AND gates having inputs connected in a predetermined, scrambled pattern to said keyboard.

28. The validator of claim 27 wherein said AND gate arrays also have inputs connected in a predetermined, scrambled pattern to outputs of said scrambler circuit.

29. The validator of claim 27 including a control shift register for shifting each successive entry of said code data to successive ones of said AND gate arrays.

30. The validator of claim 29 wherein said validity indicating means includes a release shift register for advancing a step in response to each output from one of said AND gate arrays.

31. The validator of claim 30 wherein said scrambler circuit comprises a plurality of shift registers coupled to said keyboard in a predetermined, scrambled pattern so each actuation of a key on said keyboard to enter said data derived from said card or check indicia advances one of said shift registers, and means for connecting said AND gate arrays to outputs of said shift registers in a predetermined, scrambled pattern.

32. The validator of claim 8 wherein said card-holding means comprises a pawl arranged to allow insertion of said card into said receiving means and to resist withdrawal of said card from said receiving means, the keys of said keyboard are arranged to signify numbers and letters of the alphabet, and said scrambler circuit has the capacity to receive different lengths of said card indicia.

33. The validator of claim 32 including means for making said card indicia visible when said card is in said receiving means, and said keyboard has 10 keys for alphabet letters and digits from 0 to 9, a key for said output shifting means, and a reset key.

34. The validator of claim 33 wherein said keyboard output shifting means comprises switch means operated by said output shifting key, and including reset means for resetting said scrambler circuit and for changing the state of said switch means to direct said output of said keyboard to said scrambler circuit, said reset means being operated by said reset key.

35. The validator of claim 34 including automatic means for operating said reset means when said card is removed from said holding means, electromagnetic means for actuating said pawl to release said card, and key and lock means for actuating said pawl to release said card.

36. The validator of claim 35 wherein said scrambler circuit comprises a plurality of shift registers coupled to said keyboard in a predetermined, scrambled pattern so each actuation of a key on said keyboard to enter said data derived from said card indicia advances one of said shift registers.

37. The validator of claim 36 wherein said comparator circuit comprises a plurality of arrays of AND gates having inputs connected in a predetermined, scrambled pattern to said keyboard and to outputs of said shift registers.

38. The validator of claim 37 including a control shift register for shifting each successive entry of said code data to successive ones of said AND gate arrays, and wherein said card releasing means includes a release shift register for advancing a step in response to each output from one of said AND gate arrays.

39. The validator of claim 38 wherein said automatic means includes switch means engaging said card and operated by removal of said card, said scrambler circuit includes a plug-in module that is interchangeable to vary the scramble pattern, and said key and lock means retains said module in place.

* * * * *